United States Patent
Jiang et al.

(10) Patent No.: US 9,124,152 B2
(45) Date of Patent: Sep. 1, 2015

(54) PERMANENT MAGNET MOTOR

(75) Inventors: Mao Xiong Jiang, Shenzhen (CN); Yue Li, Hong Kong (CN); Jian Zhao, Shenzhen (CN); Hong Min Wei, Shenzhen (CN); Ke Lin Zhou, Shenzhen (CN); Xing Zhang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 253 days.

(21) Appl. No.: 13/399,647

(22) Filed: Feb. 17, 2012

(65) Prior Publication Data

US 2012/0212080 A1 Aug. 23, 2012

(30) Foreign Application Priority Data

Feb. 18, 2011 (CN) .......................... 2011 1 0040851

(51) Int. Cl.
| | |
|---|---|
| *H02K 23/04* | (2006.01) |
| *H02K 5/14* | (2006.01) |
| *H02K 5/24* | (2006.01) |
| *H02K 7/116* | (2006.01) |
| *H02K 13/00* | (2006.01) |

(52) U.S. Cl.
CPC ................. *H02K 5/148* (2013.01); *H02K 5/24* (2013.01); *H02K 7/1166* (2013.01); *H02K 13/006* (2013.01)

(58) Field of Classification Search
CPC ....................................................... H02K 5/14
USPC ........... 310/216.111, 216.112, 177–179, 195, 310/154.22, 154.25, 40 R, 43, 83
See application file for complete search history.

(56) References Cited

U.S. PATENT DOCUMENTS

| | | | |
|---|---|---|---|
| 4,004,167 A | 1/1977 | Meckling | |
| 4,250,128 A | 2/1981 | Meckling | |
| 4,274,026 A * | 6/1981 | Haydon et al. | ................. 310/257 |
| 4,447,192 A * | 5/1984 | Tuckey | .......................... 417/360 |
| 4,670,726 A * | 6/1987 | Ogata et al. | .................... 335/212 |
| 5,092,996 A * | 3/1992 | Spielberg | ....................... 210/232 |
| 5,895,207 A * | 4/1999 | Burgdorf et al. | ........... 417/410.1 |
| 6,917,132 B2 * | 7/2005 | Honkura et al. | ......... 310/154.22 |
| 7,339,299 B2 * | 3/2008 | Sesita et al. | ...................... 310/89 |
| 7,812,484 B2 * | 10/2010 | Honkura et al. | ................. 310/44 |
| 2004/0012296 A1 * | 1/2004 | Sakai et al. | .................... 310/239 |

(Continued)

FOREIGN PATENT DOCUMENTS

| | | | | | |
|---|---|---|---|---|---|
| GB | 2193385 A | * | 2/1988 | ............... | H02K 1/12 |
| JP | 58144565 A | * | 8/1983 | ............. | H02K 21/06 |
| JP | 2006311659 A | | 11/2006 | | |
| JP | 2010136540 A | * | 6/2010 | | |
| RU | 2011778 C1 | * | 4/1994 | | |

OTHER PUBLICATIONS

Machine translation of RU 2011778.*

(Continued)

*Primary Examiner* — Naisadh Desai
(74) *Attorney, Agent, or Firm* — Muncy, Geissler, Olds & Lowe, P.C.

(57) ABSTRACT

A permanent magnet motor has a rotor and a stator. The rotor has a shaft, a rotor core and commutator fixed to the shaft, and rotor windings wound about poles of the rotor core and electrically connected to the commutator. The stator has an axially extending round housing, a ring magnet member fixed to an inner surface of the round housing, an endcap, and at least one pair of brushes in sliding contact with the commutator. A chamber is formed by the housing and the endcap. The commutator is disposed in the chamber. A window lift device incorporating the motor is also provided.

14 Claims, 4 Drawing Sheets

(56) References Cited

U.S. PATENT DOCUMENTS

| | | |
|---|---|---|
| 2004/0070296 A1* | 4/2004 | Ursel et al. ............... 310/90 |
| 2004/0164629 A1* | 8/2004 | Kawakami et al. ......... 310/75 R |
| 2004/0189120 A1* | 9/2004 | Takashima et al. ......... 310/89 |
| 2012/0169163 A1* | 7/2012 | Imai et al. ............... 310/71 |

OTHER PUBLICATIONS

Machine translation of RU 2011778, Padkopaev et al., Installation for the preparation of the mixture of saltpeter for the sake of the liquid by fules Dec. 31, 1967, all pages.*

* cited by examiner

PERMANENT MAGNET MOTOR

CROSS REFERENCE TO RELATED APPLICATIONS

This non-provisional patent application claims priority under 35 U.S.C. §119(a) from Patent Application No. 201110040851.5 filed in The People's Republic of China on Feb. 18, 2011.

FIELD OF THE INVENTION

This invention relates to a motor with permanent magnets, and also relates to a window lift device which comprises the permanent motor and a gearbox driven by the motor.

BACKGROUND OF THE INVENTION

A traditional permanent magnet motor for a device which raises and lowers window of automobiles comprises a stator and a rotor rotatably mounted to the stator. The rotor has a shaft, a rotor core and a commutator fixed onto the shaft, and rotor windings wound on the rotor core and electrically connected to the commutator. The stator comprises a housing and two separate permanent magnets fixed to the inner surface of the housing.

There is a desire to minimize noise from the window lift motor to avoid the driver and passengers being annoyed. The present invention aims to provide a low noise permanent magnet motor which is particularly suitable for use in a window lift device.

SUMMARY OF THE INVENTION

Accordingly, in one aspect thereof, the present invention provides a permanent magnet motor comprising: a rotor comprising a shaft, a rotor core fixed on the shaft, a commutator fixed on the shaft and adjacent to the rotor core, and rotor windings wound about poles of the rotor core and electrically connected to the commutator; and a stator comprising an axially extending round housing, a ring magnet member fixed to an inner surface of the round housing, an endcap fixedly mounted to the housing, and at least one pair of brushes in sliding contact with the commutator, the round housing and the endcap forming a chamber with the commutator being disposed therein.

Preferably, the ring magnet member forms four magnetic poles, the rotor core has ten poles, and the commutator has ten segments.

Preferably, the ring magnet member is a single piece formed by over-molding four separate permanent magnets uniformly disposed in a circumferential direction.

Preferably, the endcap has a circular ring part pressed into the round housing, a side part with at least one pair of brush brackets formed thereon, and a bearing holder for holding a bearing for supporting the shaft.

Preferably, the ratio of the axial length of the rotor core to L/N is from 1.27 to 2.31, where L is the circumference of a circle formed by outer surfaces of the rotor poles and N is the number of magnetic poles of the stator.

Preferably, the distance D between centers of two axial ends of each rotor pole projected on a surface perpendicular to the shaft 16 is from 0 to W, where W is the distance between the centers of adjacent rotor poles.

Preferably, the ratio of the radial thickness of the ring magnet member to the radial thickness of the round housing is from 1 to 2.14.

Preferably, the ratio of the radial thickness of the ring magnet member to the outer diameter of the ring magnet member is from 0.07 to 0.11.

Preferably, the ratio of the radial thickness of the round housing to the outer diameter of the round housing is from 0.045 to 0.62.

Preferably, at least one pair of brush brackets is formed on the endcap, each brush being slidably received in a brush holder which is fixedly mounted to an inner surface of a respective brush bracket.

Alternatively, at least one pair of brush brackets are formed on the endcap, and each brush is slidably held between a respective pair of guide pins which extend into a respective brush bracket.

Preferably, the pair of guide pins is supported by a body which is fixed to the endcap by a snap fit press-in connection.

According to a second aspect, the present invention provides a window lift device, for moving a window pane in a vehicle, comprising the permanent magnet motor as described above, and a gearbox driven by the motor.

In the embodiments, the ring magnet member can improve the natural frequency of the stator and decrease the vibratory amplitude of the stator. Compared to the square housing, the round housing has an evener shape which leads the motor to less noise. The stator forms an enclosure structure so that the noise inside the motor can not be diffused to the outside. The configuration of the rotor poles being skewed reduces electromagnetic harmonics, cogging and vibration. In summary, the motor has low noise and low vibration.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
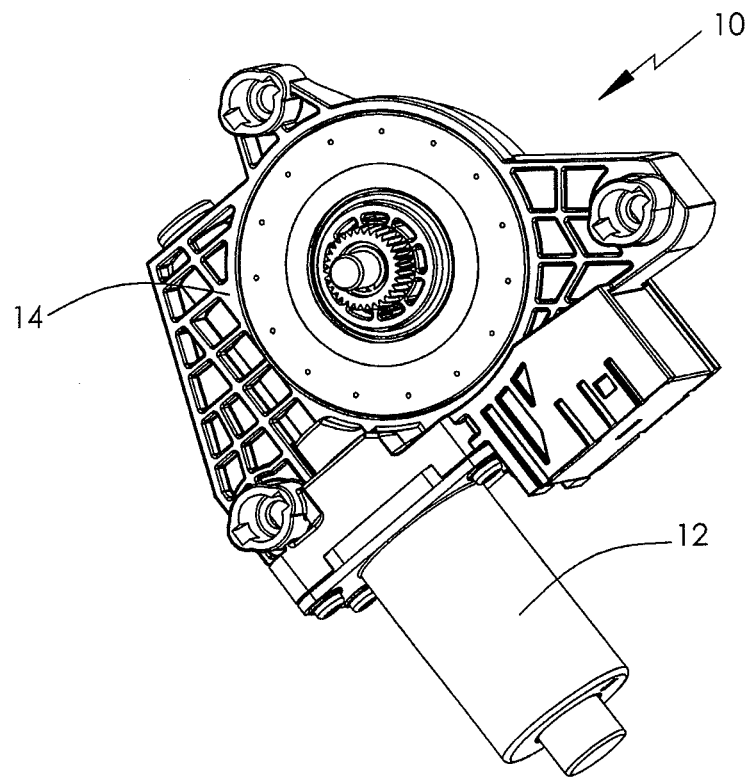
FIG. 1 illustrates a window lift device incorporating a PMDC motor in accordance with a preferred embodiment of the present invention.
Figure 2:
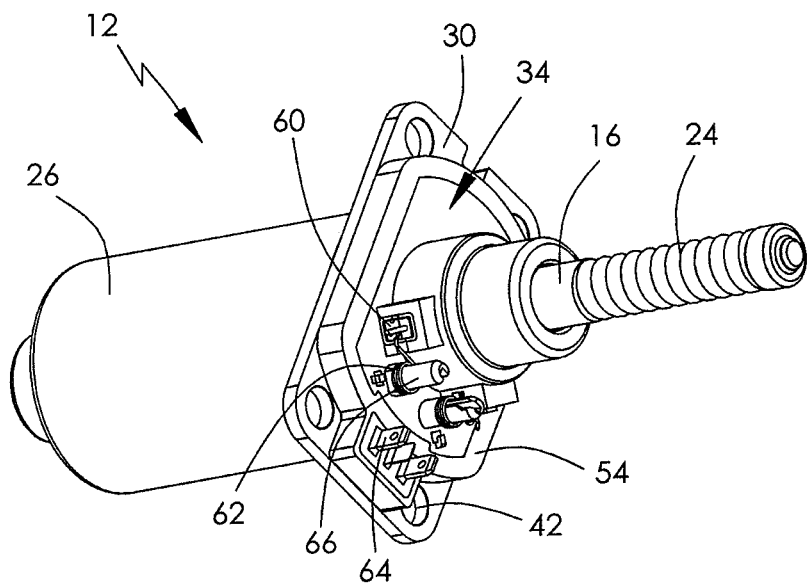
FIG. 2 illustrates the PMDC motor.
Figure 3:
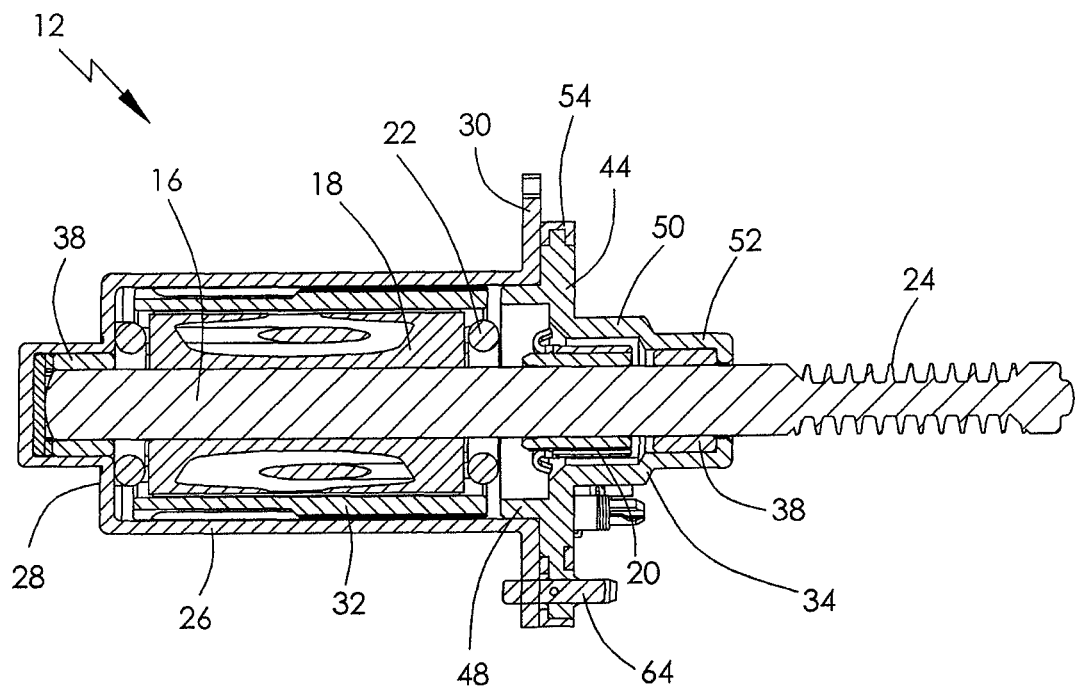
FIG. 3 is a longitudinal sectional view of the motor of FIG. 2.
Figure 4:
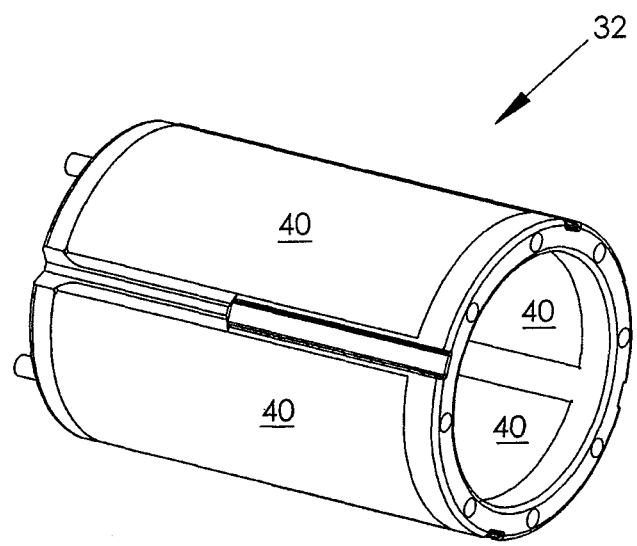
FIG. 4 illustrates a ring magnet member being a part of the motor of FIG. 2.

FIG. 1 illustrates a window lift device 10 comprising a PMDC motor 12 in accordance with a preferred embodiment of the present invention and a gearbox 14 driven by the PMDC motor 12. The window lift device is used in a vehicle to raise and lower a window pane.

Referring to FIGS. 2 to 5, the PMDC motor 12 comprises a stator and a rotor. The rotor comprises a shaft 16, a rotor core 18 fixed on the shaft 16, a commutator 20 fixed on the shaft 16 adjacent to the rotor core 18, and rotor windings 22 wound about poles of the rotor core 18 and electrically connected to the commutator 20. The outer surfaces of the rotor poles form a circle. Slots are formed between adjacent rotor poles for accommodating the rotor windings 22. A worm 24 is arranged at one end of the shaft 16 to drive a worm gear (not shown) inside the gearbox 14.

Figure 5A:
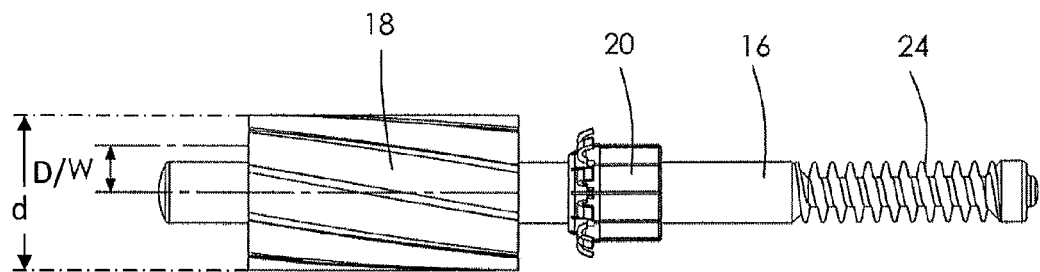
FIG. 5A illustrates a rotor being a part of the motor of FIG. 2, with rotor windings removed.
Figure 5B:
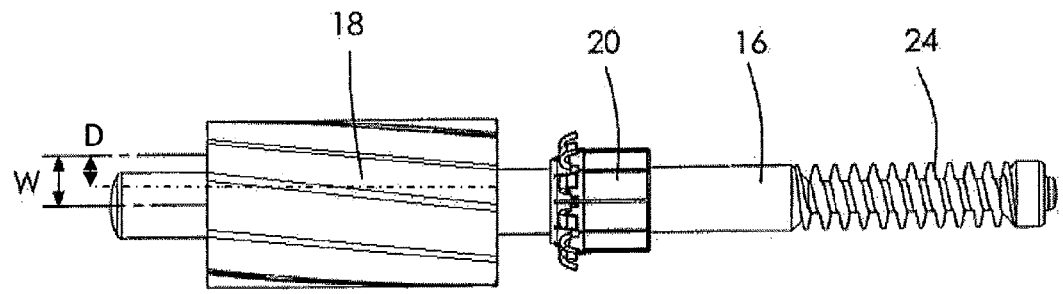
FIG. 5B illustrates another embodiment of a rotor being a port of the motor of FIG. 2, with rotor windings removed.

Preferably, the rotor core 18 has ten slots and the commutator 20 has ten segments. The ratio of the axial length of the rotor core to L/N is from 1.27 to 2.31, where L is the circumference of the circle formed by the outer surface of rotor poles and N is the number of magnetic poles of the stator; and $L=\pi*d$, where d is the diameter of the rotor core 18, as shown in FIG. 5A. The rotor poles may be skewed so as to extend along a spiral path about the shaft. The distance D, as shown in FIGS. 5A and 5B, between the centers of two axial ends of each pole projected on a surface perpendicular to the shaft 16 may be from 0 to W, where W is the distance between the centers of adjacent rotor poles.

The stator comprises an axially extending round housing 26 having an open end, a closed end 28 and a mounting part 30 integrally and outwardly extending from the open end, a ring magnet member 32 fixed to the inner surface of the housing 26, an endcap 34 closing the open end of the housing, and a pair of brush assemblies. The endcap 34 is fixedly mounted to the housing 26. The shaft 16 is supported by two bearings 38 respectively located in the endcap 30 and the closed end 28 of the housing with the rotor core 18 confronting the ring magnet member 32. An air gap is formed between the rotor core 18 and the ring magnet member 32. Preferably, the ring magnet member 32 is a single piece formed by over-molding four separate permanent magnets 40 uniformly disposed in the circumferential direction to form four magnetic poles. Preferably the magnets are over molded using an insert molding process. It is easy to fix the ring magnet member to the housing since it is a single piece. Alternatively, the ring magnet member may be a single piece ring magnet. The permanent magnets 40 may be made of ferrite or bonded NdFeB. The mounting part 30 has a number of holes 42 for mounting the motor 12 to the gearbox 14.

Preferably, the ratio of the radially thickness of the ring magnet member to the radially thickness of the round housing is from 1 to 2.14. The ratio of the radial thickness of the ring magnet member to the outer diameter of the ring magnet member is from 0.07 to 0.11. The ratio of the radial thickness of the round housing to the outer diameter of the round housing is from 0.045 to 0.62.

Figure 6:
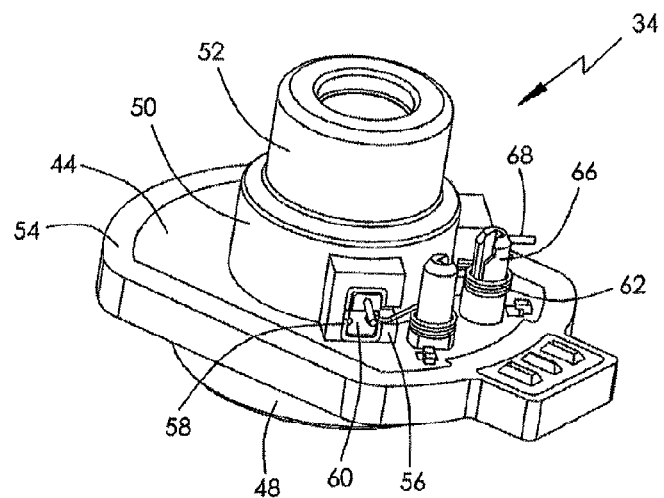
FIG. 6 illustrates an end cap being a part of the motor of FIG. 2.

Referring to FIG. 6, the endcap 34 may be made of plastic and has a base plate 44 with a central hole, a circular ring part 48 axially extending from the housing side of the base plate 44, a cylindrical side part 50 axially extending from the other side of the base plate 44, and a bearing holder 52 inwardly and axially extending from the side part 50 for holding one of the bearings 38. The circular ring part 48 is pressed into the housing so as to contact the inner surface of round housing 26. The base plate 44 is fixed between the mounting part 30 and the gearbox 14. A sealing ring 54 is overmolded onto the outer periphery of the base plate 44 so that when assembled, the endcap is sealed to the stator and the gearbox 14.

The ring part 48, the base plate 44 and the side part 50 define a chamber with the commutator 20 being received therein. Two brush brackets 56 are formed on the side part 50. Each brush bracket 50 has a radially extending tubular portion being in commutation with the chamber and extending beyond the outer circular wall of the side part 50. Each brush assembly has a radially extending brush holder 58 fixed to the inner surface of the brush bracket 56, a brush 60 slidably received in the brush holder 58, a resilient member 62 for urging the brush 60 into sliding contact with the commutator, and a conductor (brush shunt 68) electrically connecting the brush with a corresponding electrical terminal 64 on the base plate 44. Preferably, the resilient member 62 is a coil spring sleeved on a projection 66 on the base plate 44.

Figure 7:
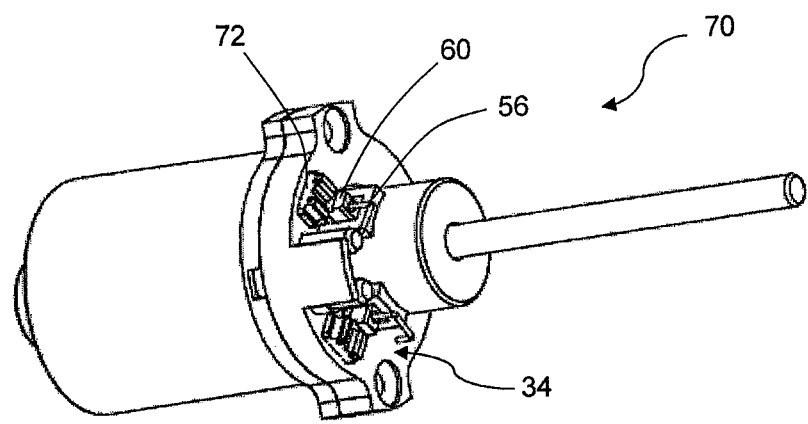
FIG. 7 illustrates a PMDC motor in accordance with another embodiment of the present invention.
Figure 8:
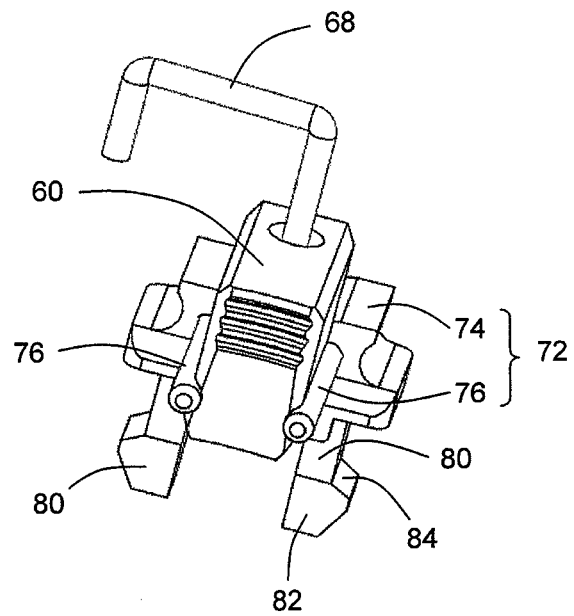
FIG. 8 illustrates a brush and brush holder being parts of the motor of FIG. 7.

FIG. 7 illustrates a PMDC motor 70 in accordance with another embodiment of the present invention. In this embodiment, as shown in FIG. 8, each brush assembly has a guiding member 72 with a body 74 and a pair of guide pins 76 radially extending from the body 74, a brush 60 held between the guide pins 76, a resilient member (not shown) for urging the brush 60 into sliding contact with the commutator, and a conductor 68 electrically connecting the brush with a corresponding electrical terminal (not shown) on the base plate 44. The body 74 of the guiding member 72 is fixed on the base plate 44 at a position radially aligned with the respective brush bracket 56. The guide pins 76 extend into the brush bracket 56 to guide the brush 60 to make sliding contact with the commutator under the urging of the resilient member.

Preferably, the body 74 is fixed to the endcap 34 by a pair of fixing arms 80 which extend axially from the body through holes in the base plate. Each fixing arm 80 has a reentrant head 82 having a rearwardly facing shoulder 84 arranged to bear against a surface of the endcap forming a snap lack or snap fit, press-in connection.

In the embodiments of the present invention, the ring magnet member can improve the natural frequency of the stator and decrease the vibratory amplitude of the stator. Compared to the square housing, the round housing has an evener shape which leads the motor to less noise. The stator forms an enclosure structure so that the noise inside the motor can not be diffused to the outside. The configuration of the rotor poles being inclined to the shaft reduces electromagnetic harmonics and vibration. In summary, the motor has low noise and low vibration.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet motor comprising:
   a rotor comprising a shaft, a rotor core fixed on the shaft, a commutator fixed on the shaft and adjacent to the rotor core, and rotor windings wound about poles of the rotor core and electrically connected to the commutator; and
   a stator comprising an axially extending round housing with an open end and a mounting part integrally and outwardly extending from the open end, a ring magnet member fixed to an inner surface of the round housing, an endcap fixedly mounted to the housing, and at least one pair of brushes in sliding contact with the commutator,
   wherein the ratio of the axial length of the rotor core to L/N is from 1.27 to 2.31, where L is the circumference of a circle formed by outer surfaces of the rotor poles and N is the number of magnetic poles of the stator, wherein the endcap has a base plate fixed to the mounting part, a circular ring part axially extending from a side of the base plate and pressed into the open end of the round housing, a circular side part axially extending from the other side of the base plate, and a circular bearing holder for holding a bearing for supporting the shaft, and wherein the ring part, the base plate and the side part define a chamber and the commutator is completely received within the chamber; and wherein at least one pair of brush brackets is id on the side part and each brush bracket has a radially extending tubular portion being in commutation with the chamber and radially extending beyond the outer circular wall of the side part, the at least one pair of brushes being respectively received in the radially extending tubular portion of a corresponding brush bracket.

2. The motor of claim 1, wherein the ring magnet member forms four magnetic poles, the rotor core has ten poles, and the commutator has ten segments.

3. The motor of claim 1, wherein the ring magnet member is a single piece formed by over-molding four separate permanent magnets uniformly disposed in a circumferential direction.

4. The motor of claim 1, wherein the distance D between centers of two axial ends of each rotor pole projected on a surface perpendicular to the shaft is from 0 to W, where W is the distance between the centers of adjacent rotor poles.

5. The motor of claim 1, wherein the ratio of the radial thickness of the ring magnet member to the radial thickness of the round housing is from 1 to 2.14.

6. The motor of claim 1, wherein the ratio of the radial thickness of the ring magnet member to the outer diameter of the ring magnet member is from 0.07 to 0.11.

7. The motor of claim 1, wherein the ratio of the radial thickness of the round housing to the outer diameter of the round housing is from 0.045 to 0.62.

8. The motor of claim 1, wherein at least one pair of brush brackets are formed on the endcap, each brush being slidably received in a brush holder which is fixedly mounted to an inner surface of a respective brush bracket.

9. The motor of claim 1, wherein at least one pair of brush brackets are formed on the endcap, and each brush is slidably held between a respective pair of guide pins which extend into a respective brush bracket.

10. The motor of claim 9, wherein the pair of guide pins is supported by a body which is fixed to the endcap by a snap fit press-in connection.

11. A window lift device, for moving a window pane in a vehicle, comprising the permanent magnet motor of claim 1, and a gearbox driven by the motor.

12. The motor of claim 1, wherein the circular bearing holder has an inner diameter less than that of the circular side part.

13. The motor of claim 1, wherein the circular bearing holder has a flange extending inwardly from an axial end thereof, the flange abutting an axial end of the bearing away from the commutator and the shaft extend through the flange.

14. The motor of claim 1, wherein the ring part, the base plate, the side part and the brush brackets are integrally formed as a single piece.

* * * * *